Patented May 4, 1954

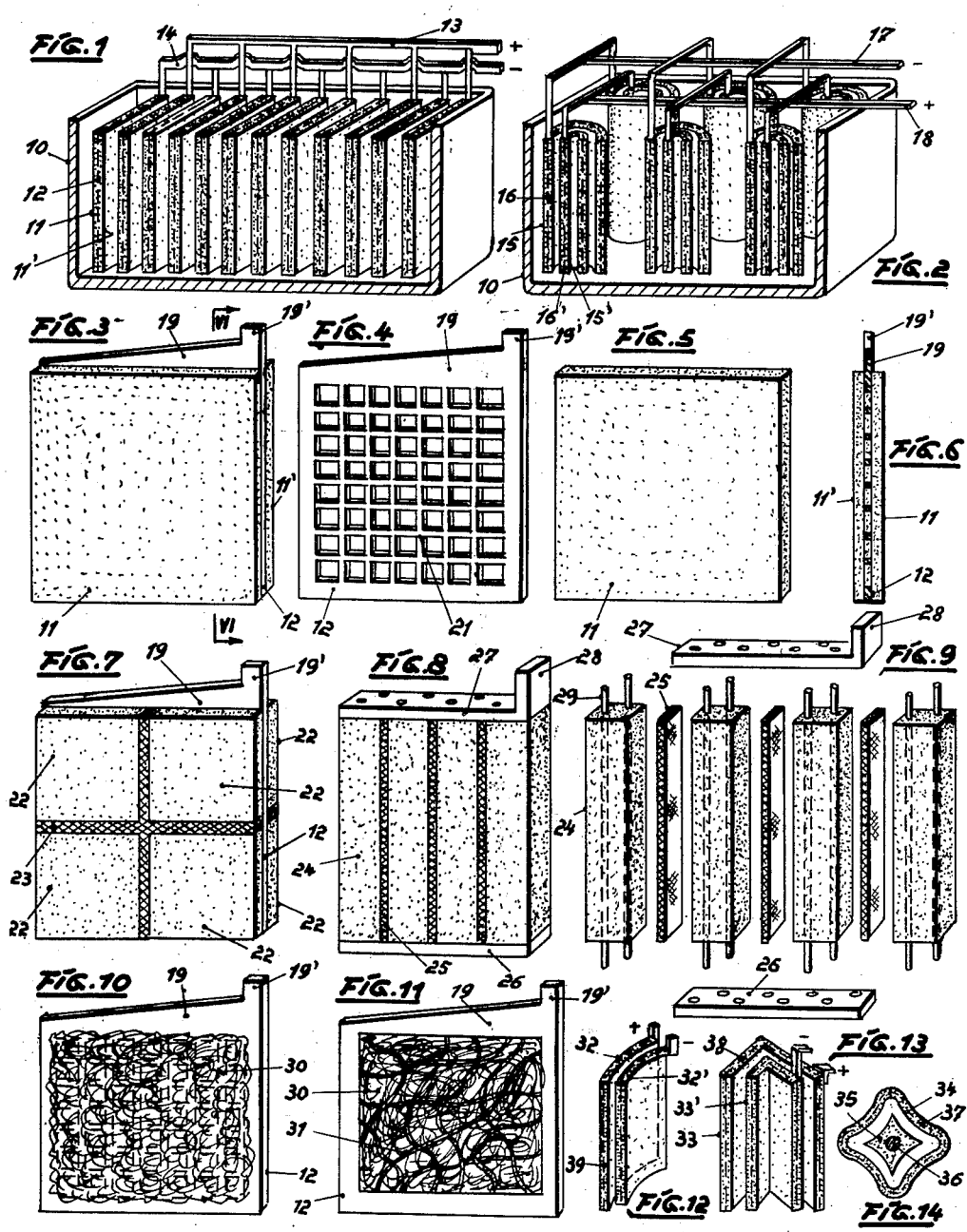

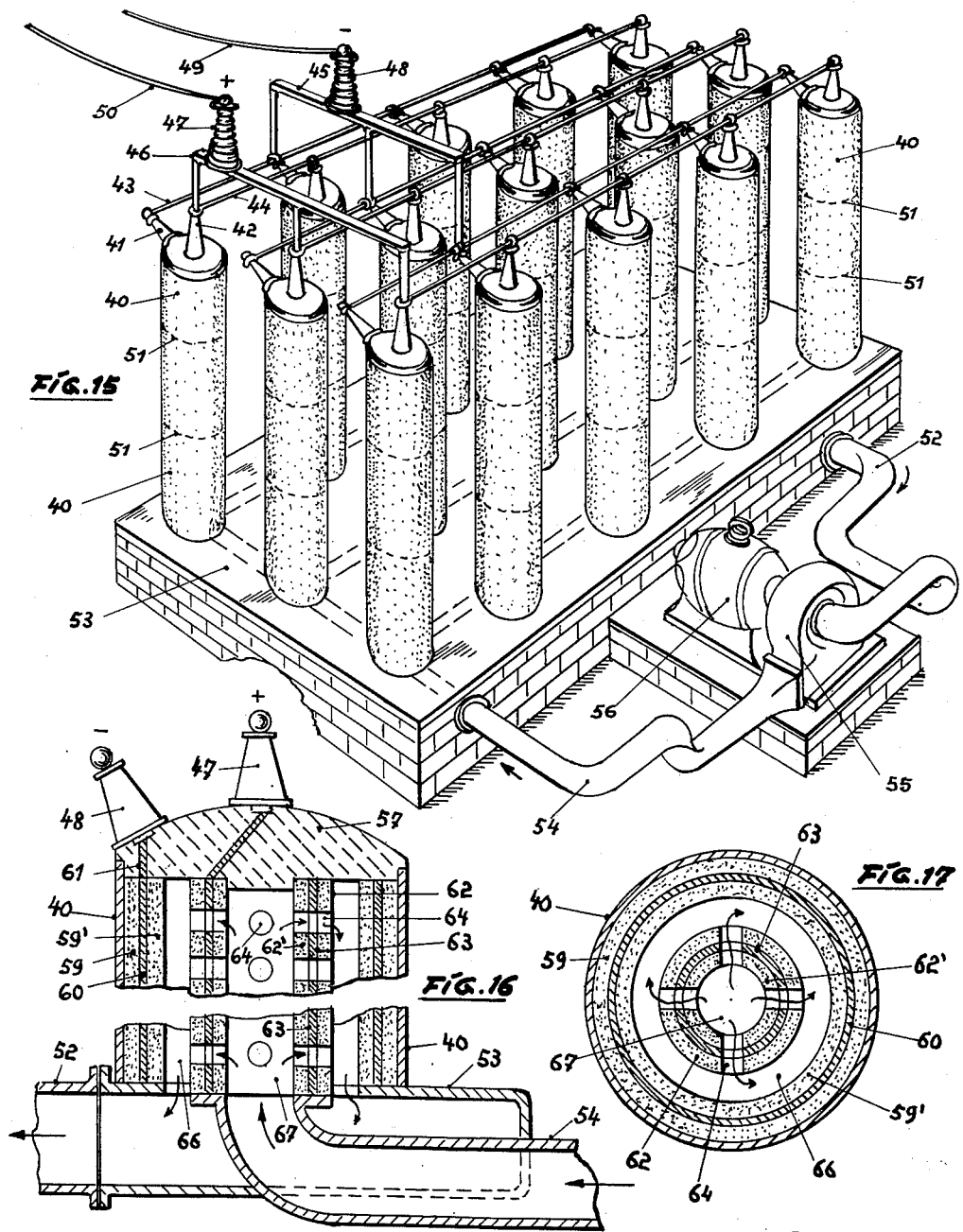

2,677,713

UNITED STATES PATENT OFFICE 2,677,713

CELL UNIT FOR ACCUMULATORS AND METHOD TO PRODUCE IT

Valentin Weil and Wilhelm Heberer, Frankfurt am Main, Germany

Application July 13, 1951, Serial No. 236,504

9 Claims. (Cl. 136—26)

The present invention relates to cell units for accumulators, preferably lead accumulators.

Prior art electrode members or plates used in cell units of lead accumulators, amongst other things, have the most inconvenient feature of being very heavy in relation to their capacity. A ground therefore results from the fact that a usual lead electrode requires a heavy inactive frame-like grid supporting the active paste.

According to the present invention it has been found and empirically proved that certain artificial products or plastics are well adapted for the production of positive and negative electrode members by moulding, forcing or die-casting. Said artificial products or plastics are representatives or derivates from the following parent substances:

(a) Carbon (e. g. phenol resins);
(b) Water gas (e. g. urea resins);
(c) Carbon/lime (e. g. polyvinyl chloride);
(d) Wood (e. g. viscose);
(e) Milk (e. g. casein, formaldehyde);
(f) Silicon (e. g. silicons, varnish gums, rubber);
(g) Boron nitride compounds (e. g. borazol).

All these parent substances have representatives and derivates which are not affected by dilute and even concentrated sulphuric acid, as well as they are not subjected to oxidation, reduction, or separation of ozone. Without any difficulty in processing said derivates are able to absorb active pastes, such as for example lead dust, litharge, red lead or the like, up to the tenfold amount of their net weight. Certain substances added to by way of suitable processes allow to regulate the chemical and physical characteristics such as porosity and electrical conductivity. Thus, it is possible to produce gridless or unarmored members of high strength and any shape, which are preferably adapted to be used as essentially improved electrode members in accumulators.

With the foregoing in mind, it is an important object of the instant invention to provide new and useful accumulator cell units having electrode members enabling the construction of lighter, stabler, and more efficient accumulators, especially lead accumulators.

A further object of the invention resides in the provision of a cell unit having electrode members which do not require a frame-like or armoring grid supporting the active paste.

Also an object of this invention is the provision of an accumulator cell unit having electrode members the active layers of which partly consist of artificial binding products or plastics which are stable against acids, oxygen, hydrogen, and ozone, and adapted to absorb active paste, such as lead oxide, red lead, iron powder or nickel powder, to a multiple amount of their net weight, said active layers embracing thin inner current conducting portions.

Still another object of the invention is to provide suitable processes for producing said new accumulator cell units by moulding, forcing or die-casting operations with permanent or temporary addition of suitable substances so as to control the shape, strength, stability, porosity, and conductivity of electrode members.

While some of the more salient features, characteristics and advantages of the instant invention have been above pointed out, others will become apparent from the following disclosures, taken in conjunction with the accompanying drawings, in which:

Figure 1 is a perspective front view of an accumulator including twelve plate electrodes, partly in section;

Figure 2 is a perspective front view of an accumulator including six tubular cell units or pairs of electrodes, partly in section;

Figure 3 is a perspective side view of a plate electrode produces on the method in accordance with the invention;

Figure 4 shows a side elevation of a current conducting grid or intermediate member;

Figure 5 is a side view of an electrode layer plate or blanket;

Figure 6 shows a vertical sectional view taken substantially as indicated by the line VI—VI of Figure 3;

Figure 7 is a perspective front view of a plate electrode the lateral layer plates of which are separated into four rectangular panels;

Figure 8 is a side elevation of a positive plate electrode composed for four ashlar-like electrode portions;

Figure 9 is an exploded perspective side view of the plate electrode illustrated in Figure 8;

Figure 10 is a side elevation of a current conducting grid or intermediate member accumulated with filaceous electrode portions;

Figure 11 is a side view of a current conducting grid or intermediate member accumulated with both filaceous electrode portions and lead fibres wherein said lead fibres are adapted to lead the current away to a contact frame;

Figures 12 and 13 are perspective views of different pairs of electrodes;

Figure 14 shows a transversal sectional view of an electrode combination having a modified shape;

Figure 15 is a perspective view of an electric power accumulating plant constituted by cell units or pairs of electrodes having extensive dimensions;

Figure 16 is a longitudinal section of a cell unit or pair of electrodes shown in Figure 15; and Figure 17 shows a cross section of the same.

Referring now more specifically to the drawings, in Figure 1 there is shown a container 10 of an accumulator comprising twelve plate electrode members and connecting means 13, 14. Each plate electrode member is constituted by two layer plates or blankets 11, 11' which consist of plastics or artificial products containing sufficient active paste and which are jointed one to another by pressing operations, thereby embracing a current conducting grid or intermediate member 12 embedded therein. In Figure 2 there is shown another accumulator container 10 involving six tubular cell units or pairs of electrode members. Each outer tubular electrode member 15 provided with a current conducting grid or intermediate member 16 is negative and encloses a positive tubular electrode member 15' having a current conducting grid or intermediate member 16'. Similar electrode members are connected by contact bridge pieces 17 and 18, respectively. The plate electrode members shown in Figures 3–6 have a punched or cast current conducting grid or intermediate member 12 provided with meshes 21. The current conducting grid 12 is enclosed on both sides by layer plates or blankets 11 and 11' by means of a pressing operation. 19 indicates an upper contact bridge piece having a contact lug 19'. In order to compensate the change of volume of the active paste during charging and discharging the positive plate electrode member shown in Figure 7 is separated into four panels 22 by joints 23 which are sealed by a cellular rubber-like substance. The positive plate electrode member as shown in Figures 8 and 9 comprises four ashlar-shaped portions 24 provided with current conducting wires 29. Intermediate layers consisting of a soft or cellular rubber-like substance are lined between said ashlar-shaped portions 24 being clamped and held together by contact bars 26 and 27. The upper bar 27 has a contact lug 28. The current conducting grid or intermediate member 12 shown in Figure 10 is accumulated with filaceous electrode particles 30. In the modified embodiment illustrated in Figure 11 said particles 30 are streaked with lead-antimony fibres which embody an inner conducting structure. Figure 12 shows a pair of shell-shaped electrode members 32, 32' having inner current conducting grids 39 while Figure 13 illustrates a pair of rectangular electrode members 33, 33' provided with inner current conducting grids 38. In Figure 14 there is shown the cross section of a pair of electrode members 34, 35 having a special shape so as to constitute enlarged surfaces. Said electrode members 34, 35 are provided with current conducting grids 37 and 36, respectively. Figure 15 shows a power accumulating plant comprising pairs of extensive tubular electrode members or cell units 40 which may have welding joints 51 or the like. Connecting means 41–48 connect the electrode members of the cell units 40 to negative and positive cables 49, 50, respectively. As shown in Figures 16 and 17, each cell unit comprises an outer negative electrode member including an outer tube 58, a layer 59, a tubular conducting grid or intermediate member 60 and a layer 59', and an inner positive electrode member constituted by a layer 62, a tubular conducting grid 63 and a layer 62'. The inner electrode member 62, 63, 62' is provided with passage openings 64. An annular chamber 66 is constituted between the outer electrode member 58, 59, 60, 59' and the inner electrode member 62, 63, 62' which encloses a cylindrical chamber 67. Each cell unit or pair of electrode members is closed at its top by an insulating bonnet 57 carrying pole-terminals 41, 42. The cell units 40 are mounted upon a big tank 53 containing an electrolyte. A pump 55 which is actuated by a motor moves the electrolyte through a pipe system 54 into the cylindrical chamber 67, then through the passage openings 64 of the inner electrode member 62, 63, 62' into the annular chamber 66, thus penetrating the outer porous electrode member 58, 59, 60, 59' up to its outer jacket tube 58. The electrolyte is sucked from the chamber 66 through a pipe system 52 back to the tank 53 so that the circuit is closed and the cyclic motion can be continued. With the power accumulating plant described it is possible to accumulate very great capacities. If the outer jacket tubes 58 are stable against external influences, such plants may be erected in the open air.

Carbon, water gas, carbon/lime, wood, milk, silicon, boron nitride compounds have certain derivates such as for example phenol resins, urea resins, polyvinyl chloride, viscose, casein, formaldehyde, silicons, varnish gums, rubber, borazol, respectively, which are stable against acids, even concentrated sulfuric acid, oxygen, hydrogen and adapted to absorb active pastes, such as for example lead dust, litharge, red lead or the like, up to the tenfold amount of their net weight without unfavourably influencing the processing. Thus, in contrast to prior art active pastes which require a special supporting frame or grid, it is possible to make stable paste layers or bodies of high strength and various shape, such as for example plates, profile pieces, tubes, filaceous members or the like, so as to enable the manufacture of accumulator cell units and electrode members of different kinds. The porosity of such electrode members can be controlled by adding substances, such as for example sodium carbonate, starch, tetrahydrofurane or the like, which will be removed later by boiling or rinsing operations or the like. But it is also possible to influence the degree of porosity by inserting horsehair layers which are carbonized due to heating arising during the pressing operation and rinsed by the acid. The electrical conductivity of such active pastes can be increased by inserting long fibred or small cut lead, lead-antimony compound or leaded mineral fibres or by adding very small quantities of colloidal graphite.

The process according to the present invention for example consists in adding certain colloids or colloid-like substances, such as for example gelatin, casein, methyl cellulose, acetates, to the active paste used such as lead powder, lead oxide, nickel powder, iron powder, so as to constitute electrode members which will be made insoluble with respect to the electrolyte by means of a hardening liquid such as for example alcohol and solution of formaldehyde.

By the following the process of production with accordance to the invention will be described more specifically in the case of using polyvinyl chloride: A mixture consisting of about 150 g. lead oxide, about 35 g. polyvinyl chloride, about 85 g. sodium carbonate, and 30 g. lead wool are thoroughly homogenized by means of a ball mill. The paste obtained will be pressed under a pressure of about 500 kg. per dm.² and a temperature of about 170° C. so as to constitute quadratic layers or blanket having dimensions 13 x 13 x 0.6 cm. Then a current conducting member which is preferably a cast or punched lead or lead-antimony plate having a sufficient number of meshes is located intermediate two of said layers or blankets the adjacent surfaces of which having been previously provided with a thin coating of polyvinyl chloride. Now pressure and heat to the same amount as mentioned above are applied to so as to produce an electrode member. In order to obtain the desired degree of porosity the sodium carbonate is removed by a rinsing operation with hot water. The electrode member may be provided with any number of through holes to increase the perviousness as to the electrolyte.

For the purpose of producing an electrode member of greater porosity, for example the electrode of a starter battery, a polyvinyl chloride paste containing a possibly small amount of a plasticizer is homogeneously kneaded with active paste, such as lead oxide or the like, of the eightfold quantity of the net weight of polyvinyl chloride. Then this mixture is embedded into a mould, into which is inserted a suitable current conducting member, and subjected to a heating operation under a temperature of about 160° C., thus jelling to a cellular rubber-like substance. The cooling process having to take place in the mould will solidify the paste. The plasticizer thereafter has to be lixiviated by means of a hot acid to avoid the formation of other acids during the subsequent electro-chemical process. If the plate electrode is separated into several panels the joints are sealed with a porous rubber-like compound which is adapted to be penetrated by the electrolyte. Cell units or pairs of electrode members of any shape which can be produced by moulding, forcing or die-casting can be connected to greater units by a welding or similar operation.

Although for example polyvinyl chloride generally does not conduct electric current it has been surprisingly found that if being located in an electrolyte electrodes produced by means of said substance will not impair the ionic migration. It is suggested that the electrolyte solvatizes the artificial product particles binding the active particles. A portion of sulphuric acid (about 0.5 per cent), as it were, penetrates into the artificial substance acting therein as a kind of plasticizer which makes the artificial substance porous. Moreover, as the attractive force between electropositive and negative ions is considerable the ionic migration arising during the electro-chemical process is enabled to develop without any difficulty.

This perception will be very important and even revolutionary for the whole accumulator industry as the process described enables to produce electrodes life and capacity of which is increased while their weight and quantity of lead required is decreased due to the omission of the usual grid frame supporting the active paste.

The manner of using and applying the illustrative embodiments of our invention set forth above as well as the process described will be clear from the foregoing description. It is, of course, to be understood that our invention is not limited to the specific embodiments here shown and described for purposes of illustration only. Various changes and modifications may be made in the accumulator cell unit and the method of its production set forth and in the structural details shown, without departing from the spirit and the leading ideas of this invention.

We claim:

1. A substantially self-supporting electrode for accumulators, especially of the lead type, which comprises a substantially self-supporting shaped electrode body having an electric conductor embedded therein and predominantly composed of a composition including a substantially acid-, oxygen-, hydrogen-, and ozone-resistant plastic substantially traversable for ion migration in an accumulator electrolyte and carrying dispersed throughout its mass a multiple of electrolyte responsive accumulator material by weight of plastic present, said composition having been heated to a temperature of at least incipient fusion.

2. Electrode in accordance with claim 1 in which said plastic is a member of the group consisting of polyethylene, polystyrol, polyamide, phenol resin, polyester, silicone resin, polyurethane, and polymonochlortrifluorethylene.

3. Electrode according to claim 2 in which said plastic is a thermoplastic and in which said electrolyte responsive accumulator material is of the lead compound type.

4. Method for producing a substantially self-supporting electrode for accumulators, especially of the lead type which comprises intimately mixing a normally heat fusible acid-, oxygen-, hydrogen- and ozone-resistant plastic in substantially subdivided form with a multiple of its weight of substantially subdivided electrolyte responsive accumulator material, and heating the resulting composite to a temperature of at least incipient fusion.

5. Method according to claim 4 in which said plastic is admixed in the form of a substantially aqueous dispersion.

6. Method according to claim 4 in which said plastic is admixed in the form of a substantially aqueous emulsion of its solution in a substantially organic solvent.

7. Electrode according to claim 1, in which said plastic is thermo-plastic polyethylene.

8. Method according to claim 4, in which a substantially water-soluble, finely divided material is additionally mixed with said plastic, and which includes removing said finely divided material after said fusion by washing.

9. Method according to claim 4, which includes additionally mixing with said plastic a material which will carbonize at the temperature of said heating.

References Cited in the file of this patent

UNITED STATES PATENTS

| Number | Name | Date |
| --- | --- | --- |
| 645,978 | Silvey | Mar. 27, 1900 |
| 664,679 | Renaud | Dec. 25, 1900 |
| 815,628 | Opperman | Mar. 20, 1906 |
| 913,898 | Jonas | Mar. 2, 1909 |
| 960,115 | Salom | May 31, 1910 |
| 995,162 | Lawrence | June 13, 1911 |
| 2,030,717 | Reinhardt | Feb. 11, 1936 |
| 2,177,062 | Gibbons | Oct. 24, 1939 |
| 2,514,415 | Rasch | July 11, 1950 |

FOREIGN PATENTS

| Number | Country | Date |
| --- | --- | --- |
| 20,596 of 1894 | Great Britain | Apr. 13, 1895 |